(12) United States Patent
Rasmussen et al.

(10) Patent No.: US 12,361,683 B2
(45) Date of Patent: Jul. 15, 2025

(54) SYSTEM AND METHOD FOR IDENTIFYING LENGTHS OF HARVESTED PARTICLES

(71) Applicant: CLAAS E-Systems GmbH, Dissen a.T.W. (DE)

(72) Inventors: Christoffer Rasmussen, København Ø (DK); Kristian Kirk, Koebenhavn (DK); Thomas B. Moeslund, Viborg (DK); Sven Carsten Belau, Gütersloh (DE); Frédéric Fischer, Arnsberg (DE)

(73) Assignee: CLAAS E-Systems GmbH, Dissen a.T.W. (DE)

( * ) Notice: Subject to any disclaimer, the term of this patent is extended or adjusted under 35 U.S.C. 154(b) by 400 days.

(21) Appl. No.: 17/685,747

(22) Filed: Mar. 3, 2022

(65) Prior Publication Data
US 2022/0284698 A1 Sep. 8, 2022

(30) Foreign Application Priority Data
Mar. 4, 2021 (DE) .......................... 102021105273.4

(51) Int. Cl.
| | | |
|---|---|---|
| *G06V 10/774* | (2022.01) | |
| *G01B 11/04* | (2006.01) | |
| *G06N 3/08* | (2023.01) | |
| *G06V 10/82* | (2022.01) | |

(52) U.S. Cl.
CPC ............ *G06V 10/774* (2022.01); *G01B 11/04* (2013.01); *G06N 3/08* (2013.01); *G06V 10/82* (2022.01)

(58) Field of Classification Search
CPC .. A01D 43/085; A01D 43/102; G01B 11/022; G01B 11/043; G01B 11/04; G06N 3/045; G06N 3/08; G06V 10/25; G06V 10/774; G06V 10/82; G06V 20/188
See application file for complete search history.

(56) References Cited

U.S. PATENT DOCUMENTS

| | | | |
|---|---|---|---|
| 10,789,527 B1 * | 9/2020 | Raichelgauz | G06N 3/045 |
| 2007/0266687 A1 * | 11/2007 | Diekhans | A01D 43/085 |
| | | | 56/10.1 |

(Continued)

FOREIGN PATENT DOCUMENTS

| | | |
|---|---|---|
| DE | 102014011308 A1 | 2/2016 |
| EP | 2098109 A1 | 9/2009 |

OTHER PUBLICATIONS

Rasmussen et al., "Maize Silage Kernel Fragment Estimation Using Deep Learning-Based Object Recognition in Non-Separated Kernel/Stover RGB Images" (Year: 2019).*

(Continued)

*Primary Examiner* — Kenny A Cese
(74) *Attorney, Agent, or Firm* — Lempia Summerfield Katz LLC

(57) ABSTRACT

A method and system for identifying, using a computing unit, lengths of a particle in a material flow is disclosed. The computing unit is configured to analyze images of the material flow (13) in an analytical routine and to derive particle lengths of particles of the material flow contained in the images. The particle length derived in the analytical routine may comprise an excess length, with the analytical routine being based on a machine learning method trained to find or identify particles with the excess length.

20 Claims, 4 Drawing Sheets

(56) References Cited

U.S. PATENT DOCUMENTS

| | | | |
|---|---|---|---|
| 2016/0029561 A1* | 2/2016 | Fischer | B02C 11/00 460/25 |
| 2020/0020093 A1* | 1/2020 | Frei | G06F 18/214 |
| 2020/0293814 A1* | 9/2020 | Shniberg | G06V 10/143 |
| 2020/0338599 A1* | 10/2020 | Shniberg | G06F 18/24147 |
| 2021/0110191 A1* | 4/2021 | Gruteser | G06N 3/045 |
| 2021/0129188 A1* | 5/2021 | Borrowman | B07C 5/00 |
| 2021/0146404 A1* | 5/2021 | Borrowman | B07C 5/342 |
| 2021/0243950 A1* | 8/2021 | Blank | A01M 21/02 |

OTHER PUBLICATIONS

European Search Report for European Application No. 21210784.1-1207 mailed May 19, 2022.
Monhollen, Nolan S., et al., "In-Field machine vision system for indentifying corn kernal losses," Computers and Electronics in Agriculture 174 (2020): 105496.
Rasmussen, Christopher Bøgelund, and Thomas B. Moeslund. "Maize silage kernel fragment estimation using deep learning-based object recognition in non-seperated Kernel/Stover RGB images." Sensor 19.16 (2019): 3506.
Redmon, Joseph, and Ali Farhadi. "YOLO9000: better, faster, stronger." Proceedings of the IEEE conference on computer vision and pattern recognition. 2016.

* cited by examiner

SYSTEM AND METHOD FOR IDENTIFYING LENGTHS OF HARVESTED PARTICLES

CROSS REFERENCE TO RELATED APPLICATIONS

This application claims priority under 35 U.S.C. § 119 to German Patent Application No. DE 102021105273.4 filed Mar. 4, 2021, the entire disclosure of which is hereby incorporated by reference herein. This application is further related to U.S. application Ser. No. 17/685,863 filed on the same date as the present application and is incorporated by reference herein in its entirety.

TECHNICAL FIELD

The invention relates to a system and method for identifying lengths of a particle in a flow of harvested material that comprises particles.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Camera systems can detect material that flows through an agricultural harvester. For example, EP 2 098 109 describes a forage harvester in which a flow of harvested material is recorded by a camera system, and the generated images are then subjected to an analysis to determine the particle size of the particles recorded in the images. The size of the particles is substantially determined by how intensively the harvested material is being comminuted by the cutter head and a comminuting apparatus downstream therefrom, a so-called corn cracker. The length of the chopped material determined in this way is then used for comparison with the preset so-called theoretical chop length, and for adjustment if there is a significant deviation. This adjustment may be performed in various ways (e.g., changing the feed speed of the harvested material to the cutter head and/or the rotational speed of the cutter head may cause a more intense or less intense chopping process thereby changing the particle size; the intensity of comminution by the corn cracker can be enhanced or reduced by decreasing or increasing the cracker gap).

US Patent Application Publication No. 2016/0029561 A1, incorporated by reference herein in its entirety, describes using a camera to determine the degree of comminution of corn grains in a flow of harvested material. In turn, the intensity of comminution by the corn cracker may be changed depending on the determined degree of comminution such that the cracker gap is either increased or reduced.

Excessively large particles of the chopped harvested material in the corn silage are very problematic to a farmer. Such particles can reduce the quality of the silage feed for milk cows and promote the formation of mold during storage from arising air inclusions. The length of the harvested material particles significantly depends on the farmer's conditions of use, and is largely controlled by adjusting the theoretical length of cut in the forage harvester that defines the desired particle size.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
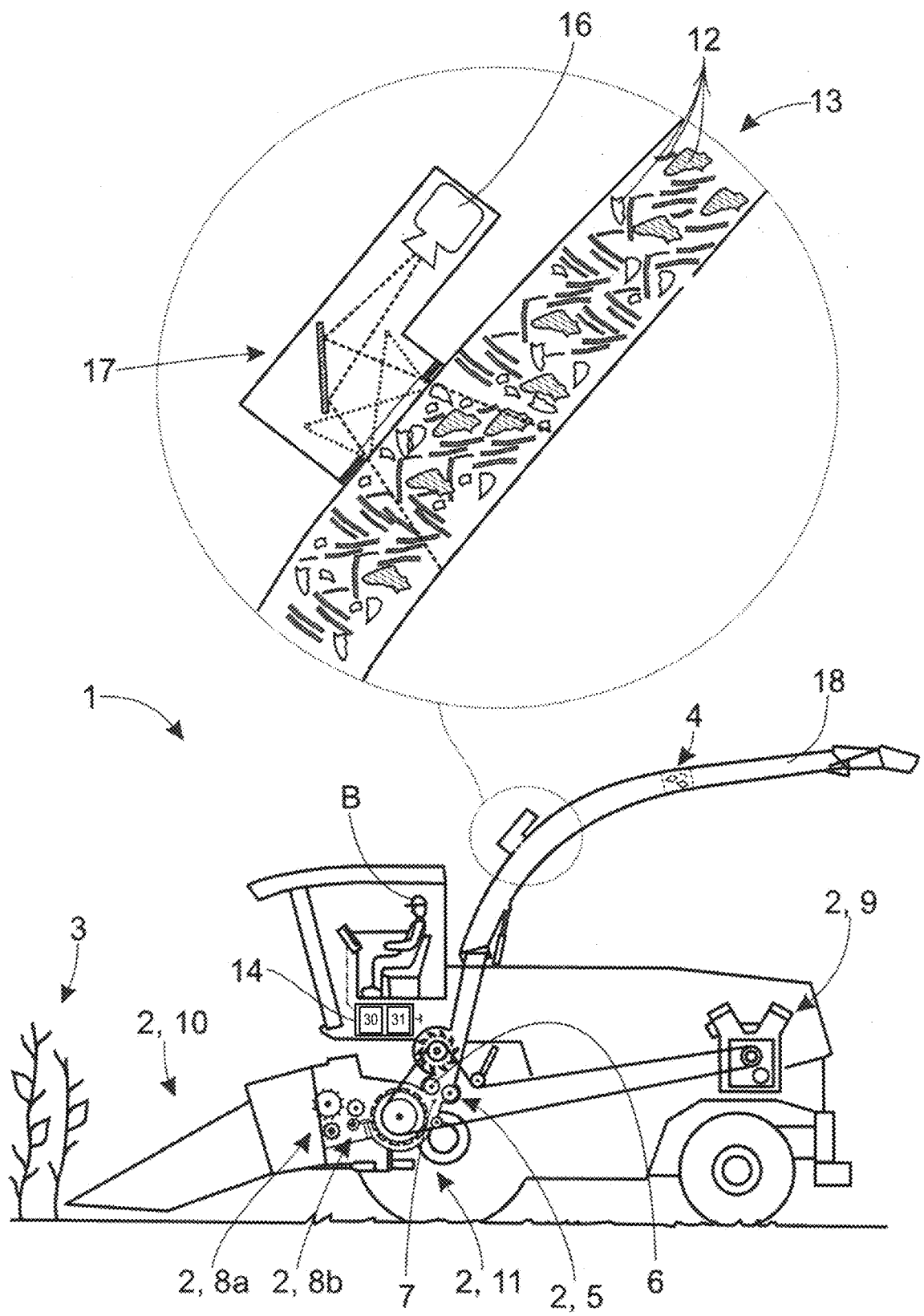
FIG. 1 shows a forage harvester that depicts the preferred application of the proposed method, FIG. 2 schematically shows the proposed machine learning method, FIG. 3 schematically shows a training step for the proposed method, and FIG. 4 schematically shows the use of the proposed method.

Forage harvesters can harvest hundreds of tons per hour, so that an efficient and robust system is beneficial to measure the quality on the field. However, the current methods frequently still require manual, error-prone separating steps, or sending samples to an external laboratory, which results in long wait times until the evaluation results.

In one or some embodiments, a method and system are disclosed that recognizes or identifies length(s) of a particle such that detection accuracy is improved and/or computing processing requirements are reduced.

Conventional methods for processing images may quickly meet their limits with chaotic and inhomogeneous flows of material. In contrast, in one or some embodiments, a machine learning method is used to improve the classification of particles even when the flows of material are chaotic; however, in most applications, the classification of all particles in an image may be impossible in real time with realistic computing power. Typically, in the agricultural context, it is unnecessary to determine a complete size histogram of all particle lengths. Rather, using a machine learning method, such as in real time, may be significantly less computing-intensive, such as when there is no attempt or need to recognize all particles in an image. Thus, in one or some embodiments, the focus is to recognize or identify particles with certain characteristics, such as with an excess length (e.g., greater than or equal to a predetermined length).

Particles with an excessive length may have a very negative effect in silage and in the feeding of livestock. In other flows of materials, particles that are too large are also normally more problematic than, for example, particles that are too small. Thus, images of the flow of harvested material are analyzed using a computing unit in an analytical routine in an agricultural harvester and, through this analysis, to derive particle lengths of the particles of the flow of harvested material contained in the images. A machine learning method may be used that is specially trained to find particles with an excess length. In contrast to conventional methods of image processing that analyze the entire image, a majority of the area of the image is eliminated very early on so that computationally intensive operations are performed much less often. This renders the methodology easier to use and may be performed in real time.

In particular, the particle length derived in the analytical routine may comprise an excess length, with the analytical routine being based on a machine learning method trained to find particles with an excess length. The analytical routine may be executed by the computing unit to ascertain an amount (e.g., a number) of particles with excess length.

Further, in one or some embodiments, the effort to train the machine learning method may be reduced. In particular, when training using manual annotations (e.g., manually tagging images), significantly fewer particles per image need be annotated by focusing on excessively long particles (and not annotate particles that are not excessively long). It may be that more images are used to train the machine learning method; however, these images may be tagged quicker so that training overall may be faster.

Thus, in one or some embodiments, a method is disclosed for a computing unit to recognize or identify lengths of a particle in a material flow that comprises (or consisting of) particles. The computing unit may be configured to analyze, using an analytical routine, one or more images of the material flow and, using this analysis, to derive particle lengths of particles of the material flow contained in the one or more images. The particle length derived in or determined by the analytical routine may comprise an excess length (e.g., a length greater than a predetermined amount), with the analytical routine being based on a machine learning method trained to find particles with the excess length.

In one or some embodiments, the material flow comprises a harvested material flow, with the harvested material flow passing through the agricultural harvester (e.g., a forage harvester). The camera of the agricultural harvester may obtain one or more images. In one or some embodiments, the camera may be positioned in the agricultural harvester at a predefined distance to the flow of harvested material. Further, the agricultural harvester (e.g., the forage harvester) may be controlled based on the found particles with the excess length. Various ways to control the agricultural harvester are contemplated. By way of example, any one, any combination, or all of the following may be controlled (e.g., adjusted) in order to control the agricultural harvester based on the found particles with the excess length: the rotational speed of the feed rollers; the rotational speed of the pre-pressing rollers; the pressure of the prepressing rollers; the rotational speed of the cutter head; or a motor rotational speed of the forage harvester. Thus, in one or some embodiments, the controlling of the agricultural harvester may occur in real time.

In one or some embodiments, the analytical routine may include a proposal step and if applicable a classification step. By separating the analytical routine into that proposal step that, using less computing power, may identify proposed regions that contain potential particles with an excess length, and a classification step that may only analyze (e.g., classify in one of a potential plurality of classes) these identified proposed regions, with more complex calculations being performed in the classification step since this classification step is only used for a subset of the sections of the image (e.g., the identified proposed regions). Further, efficiency may be further increased when the classification step at least partially reuses calculations from the proposal step.

In one or some embodiments, the analytical routine may be based on a trained neural network as the machine learning method, which may comprise a neural convolutional network. Neural convolutional networks may achieve particularly favorable results in image processing.

In one or some embodiments, the proposal step and/or the classification step may be based on a trained neural network. In particular, the proposal step and the classification step may at least partially use the same trained neural network.

In one or some embodiments, the proposal step may include using a feature extractor, such as based on a convolutional network directly or indirectly on the images to generate a feature space. In one or some embodiments, the proposal step may include the use of anchor boxes, such as on some or each pixel of the feature space. More specifically, the proposal step may include the use of a classifying neural network on the anchor boxes in order to identify the one or more proposed regions from the anchor boxes. In this way, both efficiency and precision may be combined.

In one or some embodiments, the classification step may organize the proposed regions into one or more classes, wherein at least one class may contain or being identified as particles with the excess lengths (e.g., at least one class containing or identifying acceptable particles with excess lengths and at least one class containing or identifying unacceptable particles with excess lengths). Thus, at least one class may have acceptable particles with excess length. Further, this classification into a plurality of classes may be particular interesting when certain excess lengths systematically result from the process and cannot be prevented, or only with great difficulty.

In one or some embodiments, the excess length may be defined relative to a given particle length, such as a set particle length. In particular, the excess length may be defined relative to a theoretical length of cut (TLOC) of the forage harvester (e.g., the excess length may be defined as at least 1.2 times, at least 1.4 times, at least 1.5 times, at least 1.7 times, and/or at most 2 times the theoretical length of cut (TLOC)). In one or some embodiments, the selected excess length may be dependent on normal spreads of the particle lengths and the negative effect of longer particles.

In one or some embodiments, the computing unit may select from at least two trained machine learning methods, such as at least three trained machine learning methods, with training data sets of the same machine learning method that are each trained for different excess length ranges. In one or some embodiments, the computing unit may select one of the machine learning methods based on an externally specified length, such as excess length and/or theoretical length of cut (TLOC). Specifically, it may be the case that different lengths of particles are categorized as excessively long in different processes. It is noted that the accuracy of the method may be increased when the machine learning method is only trained for a particular range of excess length. As such, responsive to input of a specific process (which may be selected from a plurality of potential processes), the particular range of excess length correlated to the specific process input may be accessed. In turn, the data set, tailored to the particular range of excess length may be used, thus providing a more accurate identification of the particles that have the particular range of excess length.

Various implementations of the training step of the machine learning method are contemplated. In one or some embodiments, the machine learning method may be trained in a training step such as based on annotated or tagged images of the material flow. The result of training may comprise the training data set. In one or some embodiments, the training step may be trained in multiple stages, such as performing general training based on the annotated or tagged images with different definitions of excess length and then performing specific training for fewer definitions of excess length (e.g., only one definition of excess length). Alternatively, only one specific training is performed in the training step for only one definition of excess length. Still alternatively, a combination is also contemplated, wherein some training data sets are first trained generally and then specifically, and other training data sets are directly trained specifically. This takes into account the fact that when there are different definitions of excess length, systematic differences between the particles may also exist that are not the same as just scaling the particles. In particular, homogeneity of a particle may frequently decrease with longer particles.

In one or some embodiments, anchor boxes, together with the neural network (e.g., together with the convolutional network and/or a classifying neural network) may be trained in the training step. In one or some embodiments, predetermined anchor boxes may be used as a starting point for training the anchor boxes, with the predetermined anchor boxes being generated by a clustering method (e.g., a k-means method from sizes of ground truth boxes of the annotated images). Thus, with the training of anchor boxes, a clustering method may be used as the starting point for the training the anchor boxes.

In one or some embodiments, at least two different training data sets may be generated in the training step depending on a type of plant, and/or a harvesting period, and/or harvesting weather. In this regard, the option of generating different training datasets may depend on various factors, such as depending on any one, any combination, or all of: a type of plant; a harvesting period; or harvesting weather. In turn, increased accuracy may be achieved when recognizing particles with excess length without increasing the amount of computing while using the method.

In one or some embodiments, weights of the neural network may be used with a precision of int8, or int16, or float8 or float16, and/or the neural network may at least partially be based on an inception architecture (e.g., an inception V2 or inception V3 architecture), and/or the neural network may be used, may be trained, or has been trained with TensorFlow or TensorFlow Lite. In this regard, computational efficiency may increase, with may assist in the real-time capability of the neural network.

In one or some embodiments, an agricultural harvester is disclosed that is configured to perform one, some, or each of the method steps disclosed above.

In one or some embodiments, a data carrier with a training data set is also disclosed for use in the disclosed method to perform one, some, or each of the method steps disclosed above.

Referring to the figures, for better comprehension, first the forage harvester 1 shown in FIG. 1 is described in greater detail, which serve as one example of the use of the disclosed method. The forage harvester 1 illustrated in FIG. 1 is for performing a harvesting process. The forage harvester 1 may include at least one work assembly 2 for harvesting a crop 3 and/or for processing harvested material 4 of the crop 3 in the context of the harvesting process. In such a case, the crop 3 may comprise corn. In one embodiment, the forage harvester 1 harvests the crop 3. Alternatively, the forage harvester 1 may only pick up a crop 3 that has already been harvested. The crop 3 obtained in this manner may then be processed by the forage harvester 1, such as chopped up.

In one or some embodiments, the harvested material 4 comprises grain components and non-grain components. The grain components may be corn grains from the corn plants. The non-grain components may be leaves, stems and the like from the corn plant.

The forage harvester 1 may have a corn cracker 5 as a work assembly 2 for processing the grain components. The operation of the at least one work assembly 2 may be adjusted responsive to receiving command(s) indicating one or more machine parameters. Specifically, the functioning of the work assembly 2 may be greatly modified by changing the one or more machine parameters. The one or more machine parameters may be various contemplated functional parameters of the work assembly 2. The machine parameters may be very specific (e.g., relating to a flow), or more abstract, such as a driving route of the forage harvester 1. The term "machine parameter" is therefore to be understood broadly.

During operation, the corn cracker 5 may comminute the harvested material 4. In one or some embodiments, the corn cracker 5 may have at least two rollers 6 that rotate during operation with an adjustable rotational speed as a machine parameter. A gap 7 remains between the rollers 6 with a gap width that may be adjusted as a machine parameter. The harvested material 4 is transported through the gap 7 while the forage harvester 1 is operating. It is also contemplated that forage harvester 1 may include more than two rollers 6 and/or more than one gap 7. In particular, the forage harvester 1 may have at least three rollers 6 and at least two gaps 7.

In one or some embodiments, the rollers 6 may have a differential adjustable rotational speed as a machine parameter by which the rotational speed of the rollers 6 differs. Given the differential rotational speed of the rollers 6, the grain components transported through the at least one gap 7 between the rollers 6 are comminuted by the rollers 6. To achieve a maximum commutation and accordingly a high processing quality of the grain components, the gap width may be adjusted to a minimum. However, this setting may consume more energy from the forage harvester 1 than necessary.

The forage harvester 1 may include feed rollers 8a and/or pre-pressing rollers 8b as a work assembly 2, each with an adjustable rotational speed as a machine parameter. A chop length of the harvested material 4 may be adjusted using this rotational speed. A theoretical length of cut (TLOC) of the chopped material may therefore result based on the physical, varying actual chop length. The forage harvester 1 may additionally or alternatively have a motor 9 as a work assembly 2 with an adjustable rotational speed as a machine parameter for driving the forage harvester 1 and for supplying the energy to at least one of the additional work assemblies 2. Moreover, the forage harvester 1 may have an attachment 10 as a work assembly 2 for picking up or collecting the crop 3. The picking up or collecting may comprise harvesting. In addition, the forage harvester 1 may also have feed rollers 8a with an adjustable rotational speed as a machine parameter in the usual way.

The forage harvester 1 may also have a cutter head 11 as a work assembly 2 for chopping up the harvested material 4. Since the cutter head 11 is frequently coupled directly to the motor 9 of the forage harvester 1, the chop length may be substantially adjustable only via the pre-pressing roller 8b without changing the motor rotational speed. Other arrangements are however also contemplated. Correspondingly, it may also be provided that the chop length is only secondarily adjustable via the prepressing roller 8b.

In one or some embodiments, the theoretical length of cut (TLOC) may be specifically adjusted using any one, any combination, or all of: the rotational speed of the feed rollers 8a; the rotational speed of the prepressing rollers 8b; a pressure of the prepressing rollers 8b; a rotational speed of the cutter head 11. In addition or alternatively, the theoretical length of cut (TLOC) may be adjusted using a number of chopping blades of the cutter head 11, wherein the chopping blades may be exchangeable. The rotational speed of the rollers 6 of the corn cracker 5 and the gap 7 that are also adjustable, may have a negligible, indirect influence on the theoretical length of cut (TLOC) and therefore need not be used to adjust TLOC. Other arrangements are contemplated.

Against this backdrop, the proposed method for recognizing lengths of a particle 12 in a flow of harvested material 13 comprising (or consisting of) particles 12 by a computing unit 14 may now be further explained. In one or some embodiments, the agricultural harvester includes at least one work assembly 2 for harvesting a crop 3. The crop 3 may be in the form of a material flow comprising a flow of harvested material 13.

The harvested material 4 may be transported as a flow of harvested material 13 through the agricultural harvester while the agricultural harvester, such as the forage harvester 1, is operating. The particles 12 may be non-restrictively grain components and non-grain components that were comminuted by the forage harvester 1.

The computing unit 14 can be part of the agricultural harvester, and/or cloud-based. In either instance, the computing unit 14 may include processing functionality, such as at least one processor 30 and at least one memory 31. Computing unit 14 may comprise any type of computing functionality, such as at least one processor 30 (which may comprise a microprocessor, controller, PLA, or the like) and at least one memory 31. The memory 31 may comprise any type of storage device (e.g., any type of memory). Though the processor 30 and memory 31 are depicted as separate elements, they may be part of a single machine, which includes a microprocessor (or other type of controller) and a memory.

The processor 30 and memory 31 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. As discussed in detail below, computing unit 14, using software (e.g., computer executable instructions for executing the analytical routine) and/or hardware, is configured to perform the functions described herein.

In one or some embodiments, the computing unit 14 is configured to analyze, using an analytical routine, the one or more images 15 of the flow of harvested material 13 and, through this analysis, to derive particle lengths L of one, some or all of the particles 12 of the flow of harvested material 13 contained in the images 15.

In one or some embodiments, the particle length L derived in the analytical routine is an excess length U, and the analytical routine is based on a machine learning method trained to find particles 12 with an excess length U. Optionally, the computing unit may ascertain an amount of particles with excess length U in the analytical routine. A machine learning method is therefore used that is specifically trained to find particles 12 with an excess length U. In so doing, particles 12 without an excess length U may, of course, be sometimes recognized in the interim and then removed or the like; however, in one or some embodiments, particles 12 without an excess length U are not systematically recognized. In particular, all of the particles 12 are not first identified and recognized, and then only those with an excess length U are analyzed. Instead, the machine learning method is trained to primarily search for particles 12 with an excess length U. This reduces the computing effort of the machine learning method in comparison to a method that analyzes all particles.

In one or some embodiments, a quantity of particles 12 with an excess length U is determined absolutely or relatively. If a share of the particles 12 with an excess length U is determined in an overall quantity of particles 12, estimated values for the overall quantity (e.g., the total number) of particles 12 may be used for this. Even a rudimentary imaging algorithm for counting the overall quantity of particles 12 is contemplated.

As previously mentioned, in one or some embodiments, the flow of harvested material 13 comprises a harvested material flow that passes or traverses through an agricultural harvester, such as forage harvester 1. In this context, camera 16 of the agricultural harvester may take one or more images 15.

Interestingly for other material flows (e.g., more generally to flows other than crops) is that the camera 16 may be positioned in order to have a predefined distance from the flow of harvested material 13 or generally from the material flow. This aspect has several advantages. First, this makes it possible to recalculate the length L of a particle 12 from pixels into a real size. Second, the situation is such that an architecture of the machine learning method and/or the training of the machine learning method may take into account the predefined distance. Object recognition in image processing is typically such that many scales in architecture and/or training the machine learning method are taken into account since the size in which the objects will finally appear in the image 15 is unclear. This problem has led to various types of solutions that however are generally associated with increased computing complexity. In the present case, it is possible to partially spare this complexity given the predefined distance of the camera 16 from the flow of harvested material 13.

In FIG. 1, the camera 16 is arranged or positioned together with an optional optical system 17 on the discharge chute 18 of the forage harvester 1. In this regard, the discharge chute is one example of the structure to transport harvested material as a flow of harvested material through the agricultural harvester. Other arrangements and other structures are however also contemplated, such as illustrated in various parts of FIG. 1.

In one or some embodiments, the agricultural harvester, in particular the forage harvester 1, is controlled based on the found particles 12 with an excess length U. This control may also be a closed-loop control and very generally may relate to the setting of a machine parameter or the like. In addition or alternatively, the amount (e.g., the number, quantity or the like) of particles 12 with an excess length U may be displayed to a user B of the agricultural harvester.

In one or some embodiments, any one, any combination, or all of the following may be adjusted based on the found particles 12 with an excess length U: the rotational speed of the feed rollers 8a; the rotational speed of the pre-pressing rollers 8b; the pressure of the prepressing rollers 8b; the rotational speed of the cutter head 11; or the motor rotational speed of the forage harvester 1. In one embodiment, the forage harvester 1 is controlled by the computing unit 14 (via command(s) generated by the computing unit) to reduce the amount of particles 12 with an excess length U.

In one or some embodiments, the agricultural harvester is controlled and/or regulated in real time based on the amount of particles 12 with an excess length U. In one or some embodiments, the term "real-time" may be interpreted broadly to mean that the reception of the data or information occurs within a given time period from when the data are sent and/or generated that is at most one-half hour, at most a few seconds (e.g., at most 30 seconds), or at most a few fractions of a second (e.g., at most one-half second).

Within the context of controlling the forage harvester 1, a plurality of images 15 are analyzed that then jointly serve as a basis for controlling. This can be performed block by block, or a running average may be formed.

The analytical routine and the preferred machine learning method are explained in greater detail with reference to FIG. 2. In this case, proposed regions 20 may be identified in a proposal step 19 of the analytical routine that contain potential particles 12 with an excess length U. One implementation of the proposal step 19 is described further below. It should be noted here, however, that in principle various proposal steps 19 are contemplated. Suitable algorithms are known under the term of "region proposal".

Afterward, in a classification step 21, the proposed regions 20 may be analyzed, such as classified, in order to determine resulting regions 22 from the proposed regions 20 that contain a particle 12 with an excess length U.

In one or some embodiments, the classification step 21 at least partially reuses calculations from the proposal step 19. This reuse may, for example, be known from the "Faster R-CNN" algorithm. In one or some embodiments, the situation may be such that the analytical routine is based on a trained neural network as the machine learning method, with the neural network being a neural convolutional network. Neural convolutional networks are known by expression of "convolutional neural network".

As explained further below, the proposal step 19 and/or the classification step 21 may be based on a trained neural network. In one or some embodiments, the proposal step 19 and the classification step 21 at least partially use the same trained neural network.

In one or some embodiments, the proposal step 19 may be based on a so-called "region proposal network". The proposal step 19 may include the use of a feature extractor directly or indirectly on the images 15 to generate a feature space 23. The feature extractor may be based on a convolutional network 24. FIG. 2 shows the feature space 23 with only one plane. Alternatively, the feature space 23 may comprise a plurality of planes.

The proposal step 19 may, moreover, include the use of anchor boxes 25, such as on each pixel of the feature space 23. Further, the proposal step 19 may include the use of a classifying neural network 26*a* on the anchor boxes 25 in order to identify the proposed regions 20 from the anchor boxes 25.

Figure 2:
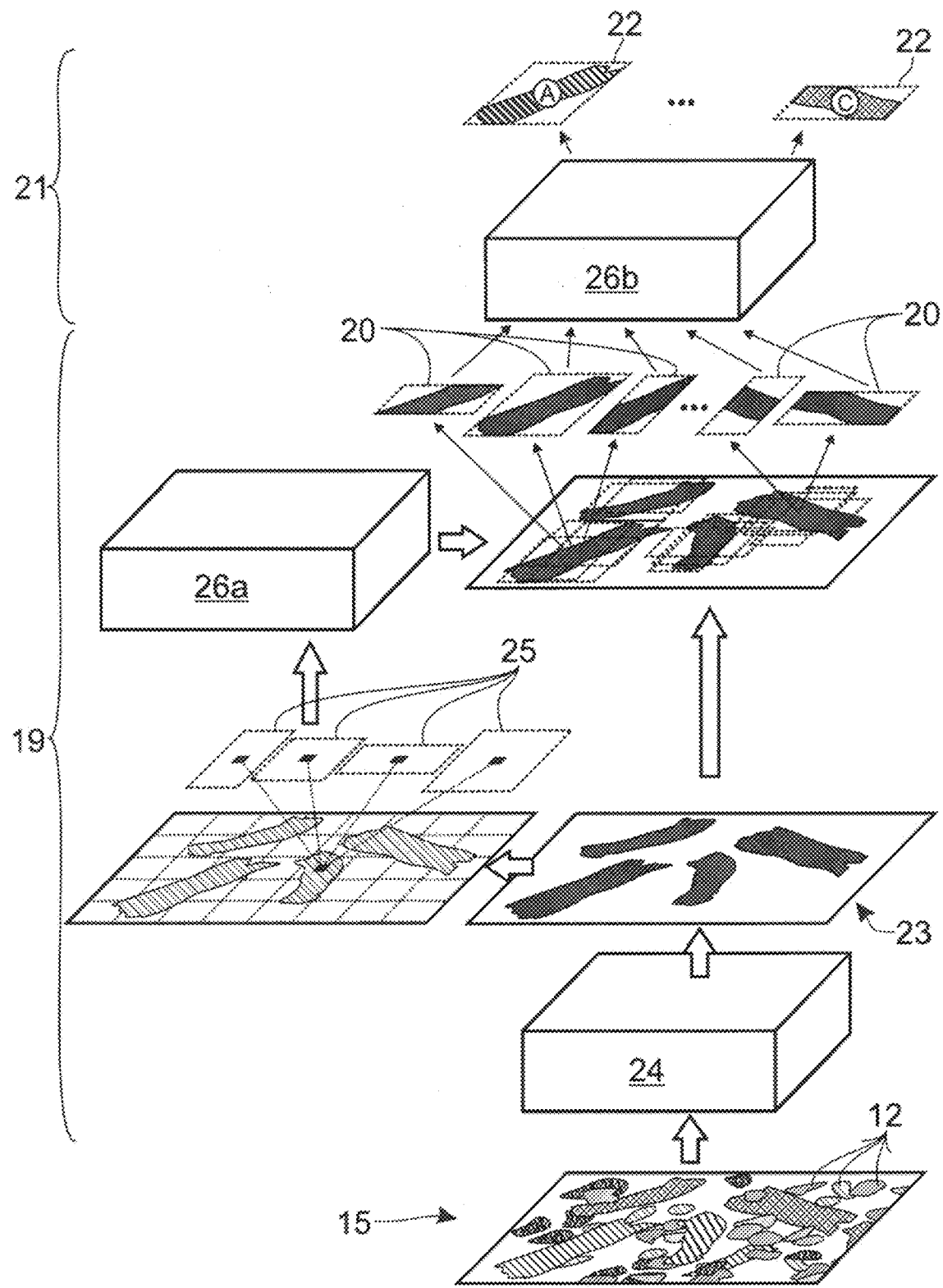

With reference to FIG. 2, the proposal step 19 may execute as a whole such that an image 15, such as a color image, is transferred with a plurality of trained filters from the convolutional network 24 into a feature space 23. The anchor boxes 25 may be applied to this features space 23 like a sliding window that are received in the classifying neural network 26*a* of the proposal step 19. This also trained neural network 26*a* may identify the most promising candidates for particles 12 with an excess length U and may output them as proposed regions 20. In so doing, their position in the original image 15 may be assigned to the anchor boxes 25.

In one or some embodiments, the subsequent classification step 21 may organize the proposed regions 20 into classes, wherein at least one class (resulting from the classification step 21) may contain particles 12 with excess lengths U. In one or some embodiments, classifications may result in at least one class may contain acceptable particles 12 with excess lengths U and in at least one class of unacceptable particles 12 with excess lengths U. With the currently emphasized use in an agricultural harvester, such as a forage harvester 1, there may be some particles 12, such as leaves, that are normally less comminuted when chopping due to their structure. Since these particles 12 with an excess length U are correspondingly inherent to the process, they may be frequently accepted.

In one or some embodiments, the classification step 21 may also be based on a classifying neural network 26*b*. This may be somewhat identical with the classifying neural network 26*a* of proposal step 19. In one or some embodiments, when a neural network is mentioned, it may comprise the convolutional network 24 and/or the classifying neural network 26*a* of proposal step 19, and/or the classifying neural network 26*a* of the classification step 21.

In one or some embodiments, the classification step 21 may organize the particles 12 into at least three classes, and/or into at most 100 classes, into at most 50 classes, or into at most ten classes.

In one or some embodiments, the proposal step 19 and the classification step 21 may be based on a machine learning method. It is however also contemplated for only one of two steps 19, 21 to be based on a machine learning method and the other of the two steps 19, 21 not to be based on a machine learning method. For example, proposal step 19 may not be founded on a machine learning method. At the same, estimating the amount of particles 12 with an excess length U may be based on the proposed regions 20.

In one or some embodiments, the excess length U may be defined relative to a given particle length L, such as a set particle length L. As such, the analytical routine may consider varying definitions of the excess length U. With regard to the present exemplary embodiment, the situation may be such that the excess length U is defined relative to a theoretical length of cut (TLOC) of the forage harvester 1 (e.g., the excess length U is defined as at most 1.2 times, at most 1.4 times, at most 1.5 times, at most 1.7 tomes, or at most 2 times the theoretical length of cut (TLOC)). The second indicated values may not be a maximum value for the excess length U, but rather may be a maximum threshold value at which an excess length U begins. In one or some embodiments, the definition of the excess length U may be adjusted on any machine that generates the flow of harvested material 13, wherein the excess length U is defined related to a set particle size. In particular, based on a machine learning method, the definition of the excess length U may be adjusted to the agricultural harvester (e.g., via input from user B), wherein the excess length U may be defined relative to a set particle size.

A trained machine learning method may not achieve consistently good results for a large range of excess lengths U. In such an instance, the computing unit 14 may select from at least two trained machine learning methods, such as at least three trained machine learning methods that are each trained for different excess length ranges. Since the machine learning methods may only differ in terms of different training data sets 29, such as the weights of the neural connections and/or anchor boxes 25, a selection of a machine learning method may be the same as a selection of the training data set 29. The architecture of the machine learning method therefore need not change.

In one or some embodiments, the computing unit 14 selects one of the machine learning methods based on an externally specified length, such as the excess length U and/or theoretical length of cut (TLOC). In such an instance, the computing unit 14 may select from a maximum of 30, or a maximum of 20, or a maximum of 10 machine learning methods or training data sets 29.

The theoretical length of cut (TLOC) may be transmitted from the forage harvester 1 to the computing unit 14, or calculated by the computing unit 14 from machine parameters of the forage harvester 1, or set by a user B or the like; alternatively, the computing unit 14 may estimate the theoretical length of cut (TLOC) from the images 15. In so doing, the computing unit 14 may, for example, access part of the machine learning method.

Figure 3:
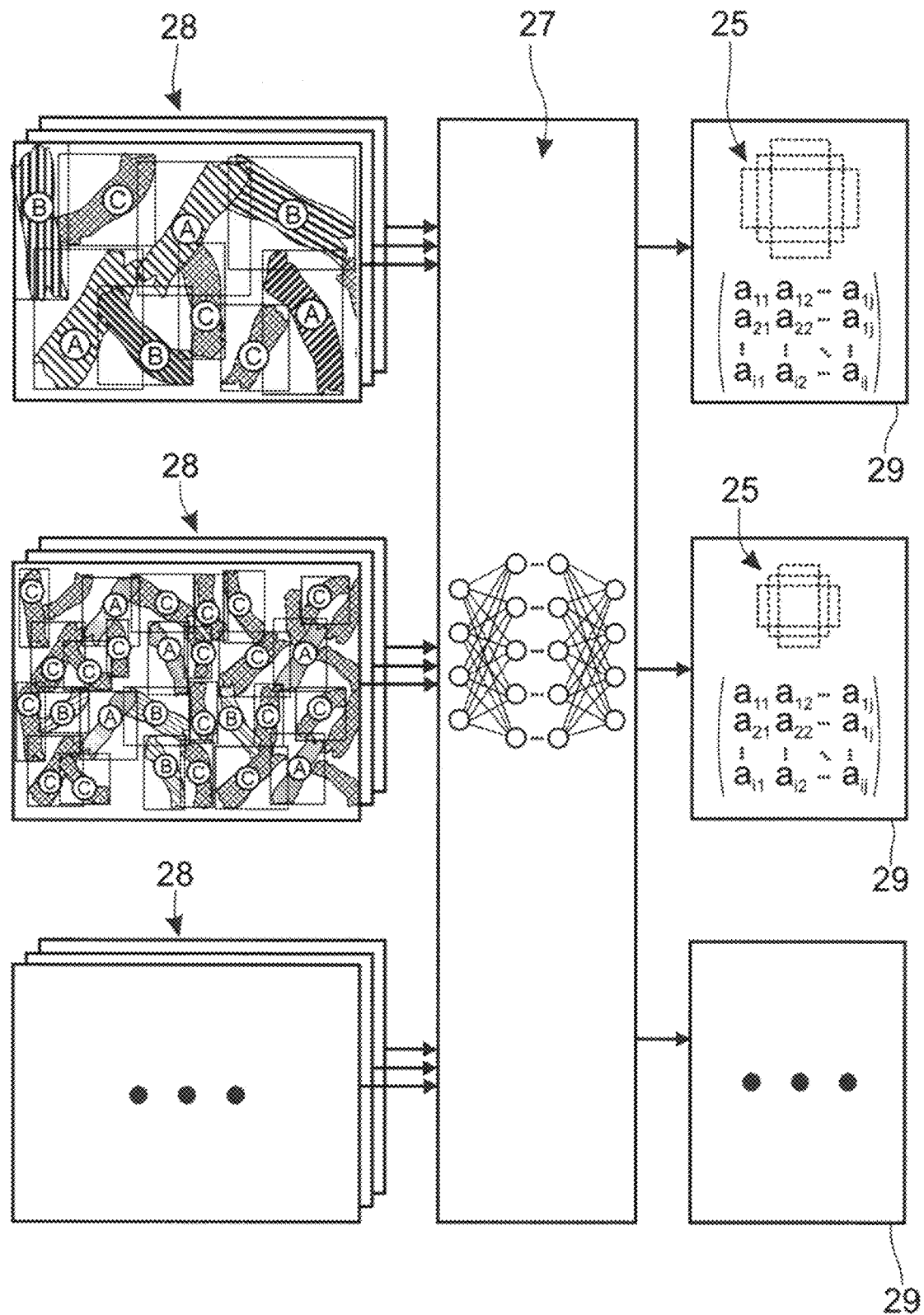
Figure 4:
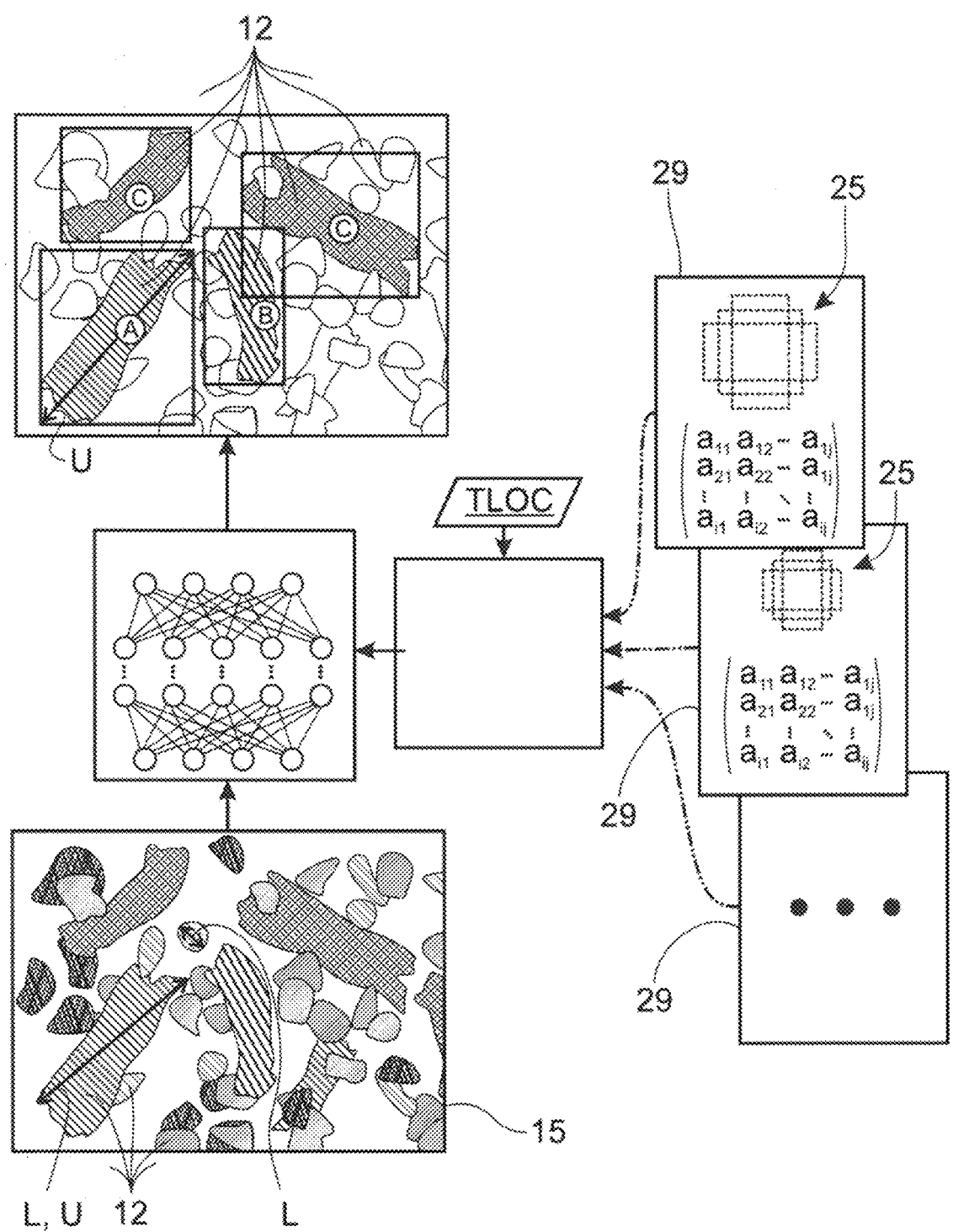

FIG. 3 shows the training of the different machine learning methods as explained further below. FIG. 4 shows the just explained use of the different machine learning methods. The machine learning method may be trained in a training step 27, such as based on annotated images 28 of the flow of harvested material 13. The result of training is a training data set 29. This may contain the weights of the neural networks and/or the anchor boxes 25.

In one or some embodiments, in the training step 27, general training is performed based on annotated images 28 with different definitions of excess length U and then specific training is performed for one definition of excess length U, and/or only one specific training is performed in the training step 27 for one definition of excess length U.

In one or some embodiments, the training step 27 may be based on annotated images 28 that were taken with the predefined distance. In one or some embodiments, only or mostly (e.g., the majority of tags are for those with an excess length U) only particles 12 with an excess length U are annotated in the annotated images 28. The training may be correspondingly oriented to excess lengths U.

In addition to the weights of the neural networks, the anchor boxes 25 may also be trained. In so doing, bottom limit values may be established for the anchor boxes 25 with reference to the excess length U. Upper limits for the sizes of the anchor boxes 25 may be statistically established by using realistic maximum particle lengths L occurring in the theoretical lengths of cut (TLOC) or generally occurring within an excess length range.

As mentioned, in one or some embodiments, the anchor boxes 25, may be trained in the training step 27 together with the neural network, such as together with the convolutional network 24, and/or the classifying neural network 26a, 26b.

The training step 27 may be shortened by a prior selection of anchor boxes 25 as a starting point for training. In this case, predetermined anchor boxes 25 may be used as a starting point for training the anchor boxes 25, and the predetermined anchor boxes 25 may be generated by a clustering method, such as a k-means method from sizes of ground truth boxes of the annotated images 28. In so doing, some or all bounding boxes of the annotated images 28 may be combined and converted into a desired number of average value boxes using the clustering method. This may correspondingly be done independent of the images 15 and the neural networks. The predetermined anchor boxes 25 may be determined differently for several theoretical lengths of cut (TLOC).

In one or some embodiments, at least two different training data sets 29 are generated in the training step 27 depending on any one, any combination, or all of: a type of plant; a harvesting period; or harvesting weather. These may be correspondingly used specifically for the agricultural harvester. For example, responsive to determining the type of plant to be harvested and/or responsive to identifying the harvesting period, and/or responsive to identifying the harvesting weather, the corresponding trained data set may be accessed.

On the technical level, the computation requirements may be reduced when the weights of the neural networks, such as the convolutional neural network, and/or the classifying neural network 26a, 26b are used with a precision of 8 or 16 bits, such as int8, or int16, or float8 or float16. In addition or alternatively, the neural network may at least partially be based on an inception architecture, such as an inception V2 or inception V3 architecture. In addition or alternatively, the neural network may be used, may be trained, or has been trained with TensorFlow or TensorFlow Lite.

In one or some embodiments, a data carrier with a training data set 29 generated with training step 27 is also disclosed for use in the disclosed method. Reference is made to all statements regarding the proposed method as being applicable to configuring the data carrier to perform any one, any combination, or all of the steps disclosed herein.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

REFERENCE NUMBERS

1 Forage harvester
2 Work assembly
3 Crop
4 Harvested material
5 Corn cracker
6 Roller of the corn cracker
7 Gap of the corn cracker
8a Prepressing roller
8b Feed roller
9 Motor
10 Attachment
11 Cutter head
12 Particles
13 Flow of harvested material
14 Computing unit
15 Image
16 Camera
17 Optical system
18 Discharge chute
19 Proposal step
20 Proposed regions
21 Classification step
22 Result regions
23 Feature space
24 Convolutional network of the proposal step
25 Anchor boxes
26a Classifying neural network of the proposal step
26b Classifying neural network of the classification step
27 Training step
28 Annotated images
29 Training data set
30 Processor
31 Memory
B User L Particle length
U Excess length
TLOC Theoretical length of cut

The invention claimed is:

1. A method for identifying lengths of particles in a flow of harvested material comprising the particles through an agricultural harvester, the method comprising:
accessing one or more images of the flow of the harvested material; and
analyzing, in an analytical routine using a computing unit, the one or more images of the flow of the harvested material in order to identify a number of the particles in the one or more images only with at least a predetermined particle length without identifying the particles that are less than the predetermined particle length thereby identifying only a subset of the one or more particles of the flow of the harvested material contained in the one or more images, wherein the analytical routine uses a trained neural network that is trained to identify the particles in the one or more images only with the at least a predetermined particle length without identifying the particles that are less than the predetermined particle length; and
controlling, based on the number of particles in the one or more images with the at least the predetermined particle length, one or more aspects of the agricultural harvester;
wherein the analytical routine determines the subset of the particles to analyze that are equal to or greater than a predetermined particle length, and
wherein the analytical routine is based on a machine learning method trained only to find the subset of the particles that are equal to or greater than the predetermined particle length.

2. The method according to claim 1, wherein the agricultural harvester comprises a forage harvester;
wherein the flow of harvested material passes through the forage harvester; and
further comprising obtaining, using at least one camera positioned at a predefined distance to the flow of harvested material, the one or more images.

3. The method of claim 2, wherein an excess length comprises particle lengths that are equal to or greater than the predetermined particle length;
wherein the forage harvester includes one or more of feed rollers, pre-pressing rollers, a cutter head, or a motor; and
wherein controlling the one or more aspects of the agricultural harvester comprises:
controlling, based on the particle lengths derived in the analytical routine that are the excess length, one or more of a rotational speed of the feed rollers; a rotational speed of the pre-pressing rollers; a pressure of the pre-pressing rollers; a rotational speed of the cutter head; or a motor rotational speed of the motor of the forage harvester.

4. The method of claim 1, wherein an excess length comprises particle lengths that are equal to or greater than the predetermined particle length;
wherein analyzing the one or more images comprises:
identifying in a proposal step one or more proposed regions in the one or more images that contain potential particles with the excess length, wherein the one or more proposed regions comprise one or more subparts in the one or more images; and
classifying, in a classification step, only the one or more proposed regions to determine resulting regions from the proposed regions that contain the one or more particles with the excess length.

5. The method of claim 4, wherein the classification step at least partially reuses calculations from the proposal step.

6. The method of claim 4,
wherein one or both of the proposal step or the classification step are based on the trained neural network.

7. The method of claim 6, wherein both the proposal step and the classification step at least partially use a same trained neural network.

8. The method of claim 6, wherein the proposal step uses a feature extractor based on a convolutional network directly or indirectly on the images to generate a feature space; and
wherein the proposal step uses anchor boxes on one, some or each pixel of the feature space.

9. The method of claim 8, wherein the proposal step uses a classifying neural network on the anchor boxes in order to identify the one or more proposed regions from the anchor boxes.

10. The method of claim 6, wherein the classification step organizes the one or more proposed regions into a plurality of classes; and
wherein the plurality of classes comprises at least one class to contain acceptable particles with excess lengths and at least one class of unacceptable particles with excess lengths.

11. The method of claim 1, wherein an excess length comprises particle lengths that are equal to or greater than the predetermined particle length;
wherein the agricultural harvester comprises a forage harvester;
wherein the excess length is defined relative to a theoretical length of cut (TLOC) of the forage harvester; and
wherein analyzing the one or more images and controlling the one or more aspects of the forage harvester are performed in real time.

12. The method of claim 1, wherein an excess length comprises particle lengths that are equal to or greater than the predetermined particle length; and
wherein training the analytical routine using the machine learning method comprises training data sets of a same machine learning method that are each trained for different excess length ranges and that excludes annotated particles less than the different excess length ranges.

13. The method of claim 1, wherein an excess length comprises particle lengths that are equal to or greater than the predetermined particle length; and
wherein the machine learning method is trained in a training step based on annotated images of the flow of harvested material by:
performing general training based on the annotated images with different definitions of excess length; and
performing specific training for at least one definition of the excess length.

14. The method of claim 1, wherein an excess length comprises the particle lengths that are equal to or greater than the predetermined particle length;
wherein analyzing the one or more images comprises identifying in a proposal step one or more proposed regions in the one or more images that contain potential particles with the excess length, wherein the one or more proposed regions comprise one or more subparts in the one or more images;

wherein the proposal step uses a feature extractor based on a convolutional network directly or indirectly on the images to generate a feature space;

wherein the proposal step uses anchor boxes on one, some or each pixel of the feature space;

wherein the proposal step uses a classifying neural network on the anchor boxes in order to identify the one or more proposed regions from the anchor boxes; and wherein the anchor boxes are trained together with the neural network in a training step by using predetermined anchor boxes as a starting point for training the anchor boxes.

15. The method of claim 14, wherein the machine learning method is trained in the training step based on annotated images of the flow of harvested material; and wherein the predetermined anchor boxes are generated by a clustering method from sizes of ground truth boxes of the annotated images.

16. The method of claim 14, wherein at least two different training data sets are generated in the training step depending on one or more of a type of plant, a harvesting period, or harvesting weather.

17. The method of claim 1, further comprising:

selecting the predetermined particle length from a plurality of different predetermined particle lengths; and responsive to selecting the predetermined particle length, selecting a respective trained neural network from a plurality of different trained neural networks, the respective trained neural network trained to identify the particles of at least the predetermined particle length, the plurality of different trained neural networks each trained for respectively identifying the particles of the different predetermined particle lengths; and wherein analyzing the one or more images is performed using the respective trained neural network that is selected.

18. An agricultural harvester comprising:

structure to transport harvested material as a flow of harvested material through the agricultural harvester;

at least one camera positioned relative to the structure in order to obtain one or more images of the flow of harvested material;

a computing unit in communication with the at least one camera, the computing unit configured to:

receive the one or more images of the flow of harvested material;

analyze, in an analytical routine, the one or more images of the flow of the harvested material in order to identify a number of particles in the one or more images only with at least a predetermined particle length without identifying the particles that are less than the predetermined particle length thereby identifying only a subset of the one or more particles of the flow of the harvested material contained in the one or more images, wherein the analytical routine is configured to use a trained neural network that is trained to identify the particles in the one or more images only with the at least a predetermined particle length without identifying the particles that are less than the predetermined particle length; and control, based on the number of particles in the one or more images with the at least the predetermined particle length, one or more aspects of the agricultural harvester;

wherein the analytical routine is configured to determine the subset of the particles to analyze that are equal to or greater than a predetermined particle length, and wherein the analytical routine is based on a machine learning method trained only to find the subset of the particles that are equal to or greater than the predetermined particle length.

19. The agricultural harvester of claim 18, wherein an excess length comprises particle lengths that are equal to or greater than the predetermined particle length;

wherein the agricultural harvester comprises a forage harvester;

further comprising one or more of feed rollers, pre-pressing rollers, a cutter head, or a motor; and wherein the computing unit is configured to control the one or more aspects of the agricultural harvester by:

controlling, based on the particle lengths derived in the analytical routine that are the excess length, one or more of a rotational speed of the feed rollers; a rotational speed of the pre-pressing rollers; a pressure of the pre-pressing rollers; a rotational speed of the cutter head; or a motor rotational speed of the motor of the forage harvester.

20. The agricultural harvester of claim 19, wherein the computing unit is configured to analyze the one or more images by:

identifying in a proposal step one or more proposed regions that contain potential particles with the excess length; and classifying, in a classification step, the one or more proposed regions to determine resulting regions from the proposed regions that contain the one or more particles with the excess length.

* * * * *